United States Patent

[11] 3,604,065

| [72] | Inventor | Walter V. Slominski |
| --- | --- | --- |
| | | Lexington, Ky. |
| [21] | Appl. No. | 786,036 |
| [22] | Filed | Dec. 23, 1968 |
| [45] | Patented | Sept. 14, 1971 |
| [73] | Assignee | Hoover Ball and Bearing Company |
| | | Saline, Mich. |

[54] CLIP FOR ATTACHING WIRES
6 Claims, 8 Drawing Figs.

[52] U.S. Cl. .................................................. 24/23 R,
  24/123 W, 24/129 W
[51] Int. Cl. ......................................................... B65d 63/06
[50] Field of Search ........................................... 24/23 W,
  23 EE, 23 B, 23, 123 W, 123, 129 W, 129 C, 129
  B, 129, 36; 248/54, 60, 62; 174/40

[56] References Cited
UNITED STATES PATENTS

| 2,691,198 | 10/1954 | Flood ............................ | 24/23 W X |
| 2,835,012 | 5/1958 | Reiter ............................ | 24/129 W |
| 2,976,592 | 3/1961 | Christin ......................... | 24/129 |

FOREIGN PATENTS

| 1,199,676 | 6/1959 | France ........................... | 24/123 W |
| 755,619 | 8/1956 | Great Britain ................. | 24/123 W |

Primary Examiner—Billy S. Taylor
Attorney—Olsen and Stephenson

ABSTRACT: A clip for attaching a pair of wires together, such as the wires used for springs in seating structures, comprising a substantially U-shape body having an arcuate bight and a pair of substantially parallel legs arranged so that when the wires to be attached are disposed between the legs and nested in the bight, the legs can be wrapped in opposite directions about the wires so as to firmly hold the wires in side-by-side relation. At least one of the legs terminates in an inclined portion which extends generally toward the other leg in the direction in which the one leg is wrapped when wrapped about the wires.

PATENTED SEP 14 1971 3,604,065

INVENTOR
WALTER V. SLOMINSKI

BY *Olsen and Stephenson*

ATTORNEYS

INVENTOR
WALTER V. SLOMINSKI

BY
*Olsen and Stephenson*
ATTORNEYS 3,604,065

CLIP FOR ATTACHING WIRES

BACKGROUND OF THE INVENTION

Wires, such as the springs in seating structures, are conventionally connected together so as to be retained in desired positions by spring clips. These clips are usually formed from a flat sheet of metal bent to a U-shape so that it has an arcuate bight and a pair of transversely spaced legs which are generally parallel. One of the legs consists of a pair of laterally spaced sections and the other one of the legs consists of a single section which is of a width substantially the same as the spacing between the pair of leg sections. As a result, when the legs are bent toward each other in wraparound relation with a pair of side-by-side wires disposed therebetween, the single leg section will be positioned between the pair of leg sections. The adjacent edges of adjacent leg sections are correspondingly inclined to facilitate a fit of the leg sections relative to each other and to facilitate the economical formation from flat sheet material. Such clips are conventionally applied with a tool which includes bending jaws that engage the ends of the clip legs and proceed to wrap the legs around the wires to be connected.

These conventional clips which are in common use are generally satisfactory but under some circumstances are found to be objectionable for several reasons. First of all, the clips can sometimes be readily peeled off the wires which they are intended to connect. Also, the edge leg sections sometimes tend to overlap the center leg section thereby leaving the clip somewhat loose on the wires. Furthermore, the clips tend to wear out the jaws on the applying tool.

It is an object of this invention, therefore, to provide an improved attaching clip which overcomes the above listed objections.

SUMMARY OF THE INVENTION

In the improved clip of this invention, inclined portions are provided at the ends of the edge leg sections, with these inclined portions extending in the direction in which the leg sections are bent when wrapped about the wires to be connected. If desired, the intermediate leg section can also be provided with a similar inclined end portion. In either event, the provision of the inclined end portions enables the leg sections to be bent around the wires to be connected so that the leg end portions extend inwardly toward the point of contact between the wires being connected. This provides for a firm assembly of the clip with the wires thereby providing the clip with increased strength and greater resistance to becoming loosened. In addition, the inclined leg end portions make it possible to apply the clip with less force and with a resulting reduced wear on the jaws of the clip applying tool.

In the clip of this invention, the adjacent edges of adjacent legs in the clip are inclined at an angle of about 10°, which is a smaller angle than that heretofore employed, to keep the edge leg sections outside the center leg section to thereby prevent the legs from overlapping when the clip is applied. The result is further increased in the strength of the clip and its ability to resist peeling.

Further objects, features and advantages of this invention will become apparent from a consideration of the following description, the appended claims, and the accompanying drawing in which:

Figure 1:
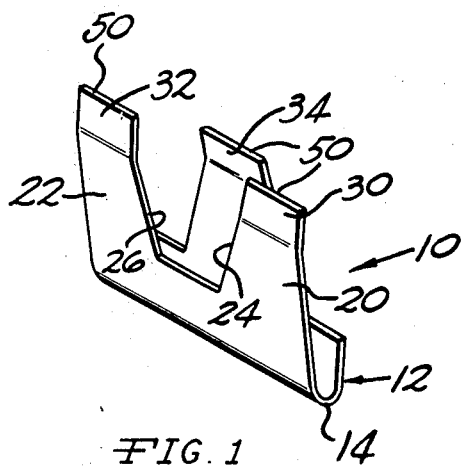
FIG. 1 is a perspective view of the clip of this invention.
Figure 2:
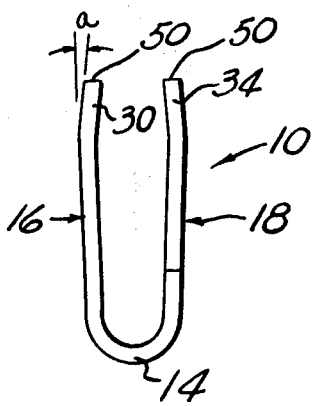
FIG. 2 is an end view of the clip of this invention.
Figure 3:
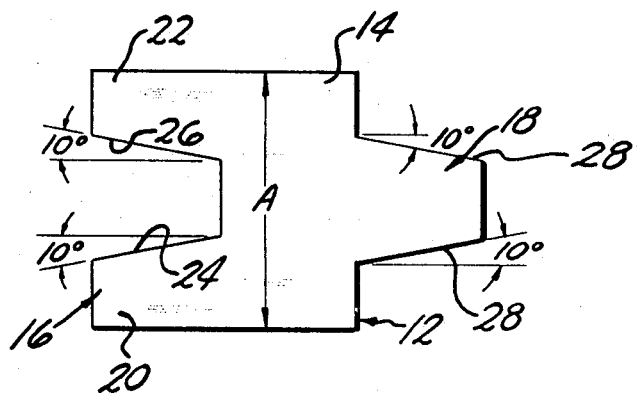
FIG. 3 is a plan view of a blanked metal piece prior to bending to form the clip shown in FIGS. 1 and 2.

With reference to the drawing, the clip of this invention, indicated generally at 10, is illustrated in FIGS. 1, 2 and 3 as consisting of a body 12 which is initially of the flat blanked shape shown in FIG. 3 and which is subsequently bent to the U-shape shown in FIGS. 1 and 2. The U-shape body 12 has an arcuate bight portion 14 and a pair of substantially parallel legs 16 and 18. The leg 16 includes a pair of laterally spaced sections 20 and 22 which are spaced apart and predetermined distance and have adjacent inclined edges 24 and 26, respectively, which are inclined inwardly toward each other at a predetermined angle, illustrated as 10° in the illustrated embodiment of the invention. The leg 18 is shaped so that it will fit in the space between the leg sections 20 and 22, as shown in FIG. 3 thus enabling stamping of a plurality of bodies 12 from a strip of sheet metal of a width indicated at "A" in FIG. 3 without any waste. Thus, the edges 28 of the leg 18 are inclined inwardly away from each other at the same angle as the leg section edges 24 and 26 and inclined toward each other, namely, 10°.

As shown in FIGS. 1 and 2, the leg sections 20 and 22 terminate in inclined portions 30 and 32, with the portions 30 and 32 being inclined toward the other leg section 18 and at an acute angle, shown at "a" in FIG. 2 relative to an extension of the leg 16. In the clip 10 illustrated in FIGS. 1 and 2, the leg 18 is provided with a similar inclined end portion 34.

Figure 6:
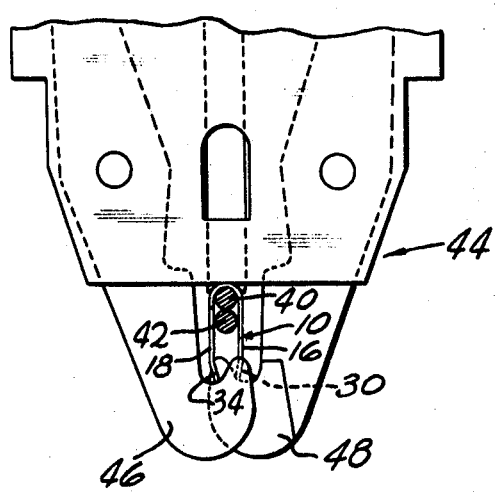
FIGS. 6, 7 and 8 are diagrammatic views illustrating a two-jaw tool operating to apply the clip of this invention to a pair of wires, showing the clip in progressively bent positions.
Figure 7:
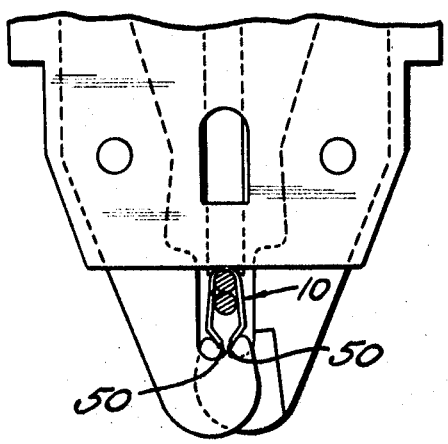
Figure 8:
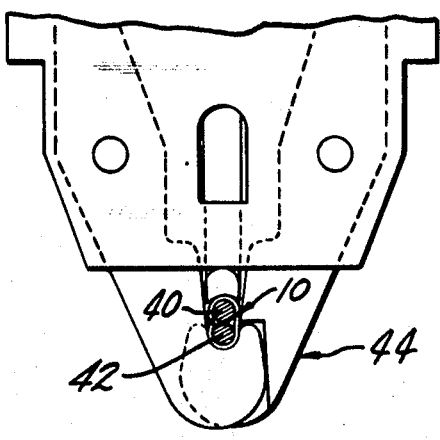

FIGS. 6, 7 and 8 illustrate how the clip 10 is applied to a pair of wires 40 and 42 so as to connect the wires. The wires 40 and 42 are positioned in side-by-side engagement with the wire 40 nested in the bight 14 and the legs 16 and 18 extending on opposite sides of the wires 40 and 42. A tool 44 having jaws 46 and 48 is then engaged with the edges 50 of the clip legs 16 and 18 and the jaws 46 and 48 are manipulated so as to progressively wrap the legs 16 and 18 about the wires 40 and 42. As shown in FIG. 6, the end portions 30, 32 and 34 of the clip 10 are inclined in the direction of the wraparound bends which are applied to the legs 16 and 18. This facilitates bending of the legs 16 and 18 in this direction and eliminates the large reaction force which the clip 10 would apply to the tool jaws 46 and 48 if the clip legs 16 and 18 were straight, as has been the case with past clips. As a result, less force is needed to bend the legs 16 and 18 and the clip 10 imparts less wear to the jaws 46 and 48.

Figure 5:
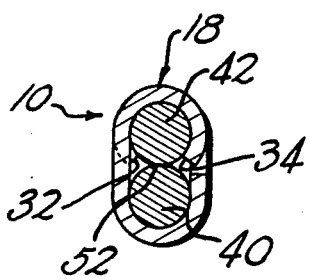
FIG. 5 is an enlarged transverse sectional view of the clip and wire assembly shown in FIG. 4, as seen from substantially the line 5—5 of FIG. 4.
Figure 4:
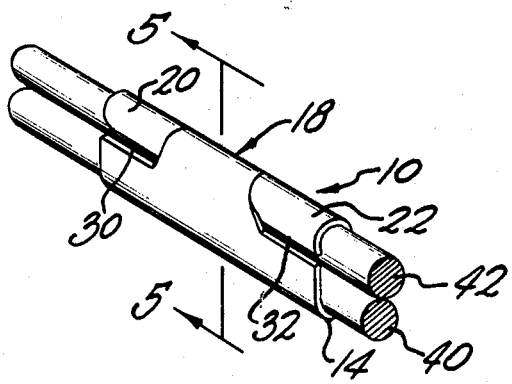
FIG. 4 is a perspective view of a pair of wires and the clip of this invention, showing the clip in position connecting the wires.

In addition, as shown in FIGS. 4 and 5, the clip end portions 30, 32 and 34 follow around the wire 42 so that they point inwardly toward the area 52 of engagement between the wires 40 and 42. This makes it more difficult to remove the clip 10 by forces tending to pull the wires 40 and 42 apart. Forces tending to move the wires 40 and 42 apart have the most effect on the edge leg sections 20 and 22, since one or the other of these leg sections initially resists the forces on the wires. As a result, in the clip 10 of this invention it is the inclined end portions 30 and 32 on the edge leg sections 20 and 22 which are most important. Accordingly, it is believed that the principal advantages of this invention can be achieved by providing the inclined end portions 30 and 32 only, but that the inclined end section 34 further improves the clip 10 because it imparts additional strength thereto when applied and makes it possible to apply the clip 10 with still less total force.

As the leg 18 is being bent into the space between the edge leg sections 20 and 22, it tends to hold the leg sections 20 and 22 apart. This function of the leg 18 is improved by the approximately ten degree inclination of the leg edges 24, 26 and 28. This inclination is less than that heretofore employed in conventional clips.

From the above description it is seen that this invention provides a clip 10 which is applied with less force by the tool 44 and with less resulting wear on the tool jaws 46 and 48. Furthermore, by virtue of the wraparound nature of the clip end portions 30, 32 and 34, in the applied position of the clip shown in FIG. 5, the clip has increased strength relative to prior art clips.

It will be understood that the clip for attaching wires which is herein disclosed and described is presented for purposes of explanation and illustration and is not intended to indicate limits of the invention, the scope of which is defined by the following claims.

What is claimed is:

1. A clip for attaching a pair of side-by-side wires comprising a substantially flat body bent to a U-shape so as to have an arcuate bight and a pair of generally parallel transversely spaced legs, one of said legs consisting of a pair of independent spaced sections and the other of said legs consisting of a single section of a width substantially the same as the spacing between said pair of independent spaced leg sections whereby when said legs are bent toward each other in wrap around relation with a pair of side-by-side wires disposed therebetween said single section will be positioned between said pair of independent, spaced sections, each of said pair of sections terminating closely adjacent the ends in a portion bent about a line disposed generally parallel to the arcuate bight and inwardly toward the one of said legs consisting of a single section.

2. A clip according to claim 1 wherein said pair of sections are substantially planar and the inwardly bend portion of each of said sections is disposed at an acute angle relative to the plane in which said section lies.

3. A clip according to claim 2 wherein said single section is also provided with a terminal portion bent about a line parallel to the axis of the bight and inwardly toward said leg comprising a pair of sections.

4. In combination with a pair of wires of substantially the same diameter positioned in side-by-side engagement, an attaching clip comprising a substantially U-shaped body having an arcuate bight and a pair of substantially parallel legs spaced apart a distance slightly greater than the diameter of said wires, one of said legs being comprised of a pair of sections spaced in a direction axially along said wires and the other of said legs being a single section disposed midway between the pair of sections in a direction axially along said wire, said body being positioned so that said pair of wires are disposed between said legs and said bight is engaged with one of said wires, said legs being spaced in a direction axially of said wires for wrapping in opposite directions circumferentially about said wires, at least one of legs having a terminal portion bent toward the other of said legs about a line extending generally parallel to said bight portion of said clip toward the other of said legs whereby the force required for clamping said clip circumferentially about said wires is initially reduces as said legs are bent inwardly to engage said wires.

5. The combination according to claim 4 wherein each of said legs is directed inwardly toward and is of a length to provide for said leg extending partially about the other one of said wires to a position in which the terminal end of said wire is adjacent the area of engagement of said wires.

6. The combination according to claim 4 wherein both of said legs terminate in said inclined portion.

PO-1050
(5/69)

UNITED STATES PATENT OFFICE
CERTIFICATE OF CORRECTION

Patent No. 3,604,065          Dated September 14, 1971

Inventor(s) Walter V. Slominski

It is certified that error appears in the above-identified patent and that said Letters Patent are hereby corrected as shown below:

Col. 1, line 60, "increased" should be -- increase --.

Col. 2, line 11, "and" , second occurrence should read -- a --.

Col. 4, line 19, "reduces" should be -- reduced --;

line 22, after "is" cancel "directed inwardly toward and is";

line 24, after "is" insert -- directed inwardly toward and is --.

Signed and sealed this 11th day of April 1972.

(SEAL)
Attest:

EDWARD M. FLETCHER, JR.                ROBERT GOTTSCHALK
Attesting Officer                      Commissioner of Patents